United States Patent [19]
Jablonsky

[11] 3,939,757
[45] Feb. 24, 1976

[54] FLUID POWER STEERING SYSTEM WITH VALVE OPERATOR CONTROL MEANS

[75] Inventor: Erich Jablonsky, Bobingen, Rems, Germany

[73] Assignee: Zahnradfabrik Friedrichshafen AG, Friedrichshafen, Germany

[22] Filed: May 7, 1973

[21] Appl. No.: 357,601

[30] Foreign Application Priority Data
May 6, 1972 Germany............................ 2222332

[52] U.S. Cl................ 91/391 R; 91/372; 91/375 A; 91/434; 91/438; 91/441; 91/465; 137/636
[51] Int. Cl.² F15B 13/10; F15B 11/08; F15B 13/04
[58] Field of Search ......... 91/441, 375 A, 359, 465, 91/437, 370, 371, 372, 373, 391 R, 434, 438; 137/636, 636.1

[56] References Cited
UNITED STATES PATENTS

| | | | |
|---|---|---|---|
| 2,063,937 | 12/1936 | Kundig................................ | 91/434 |
| 2,462,544 | 2/1949 | Parker........................ | 137/636.1 X |
| 2,781,781 | 2/1957 | Hruska........................ | 137/636.1 X |
| 2,904,957 | 9/1959 | Quayle............................ | 91/441 X |
| 2,930,357 | 3/1960 | Brueder.......................... | 91/465 X |
| 2,934,089 | 4/1960 | Meyers........................... | 91/434 X |
| 3,213,762 | 10/1965 | Dubuf............................ | 91/441 X |
| 3,353,554 | 11/1967 | Ludkin.............................. | 137/595 |
| 3,460,440 | 8/1969 | Brent............................... | 91/391 X |
| 3,464,318 | 9/1969 | Thayer et al.......................... | 91/359 |
| 3,469,890 | 9/1969 | Fulmer............................ | 91/434 X |
| 3,473,443 | 10/1969 | Mikkelsen........................... | 91/437 |
| 3,601,153 | 8/1971 | Page et al. .................... | 137/636.2 X |
| 3,630,233 | 12/1971 | Miyamoto..................... | 91/375 A X |
| 3,638,678 | 2/1972 | Symmons...................... | 137/636.1 X |
| 3,657,967 | 4/1972 | Suzuki ......................... | 91/375 A X |
| 3,772,962 | 11/1973 | Suzuki ................................ | 91/359 |
| 3,777,839 | 12/1973 | Uchiyama et al................. | 91/434 X |

FOREIGN PATENTS OR APPLICATIONS
4,323,599  3/1964  Japan............................ 137/625.62

*Primary Examiner*—Martin P. Schwadron
*Assistant Examiner*—Abraham Hershkovitz

[57] ABSTRACT

The steering wheel controlled valve operator in a fluid power steering system, is mechanically held in a neutral position by centering springs associated with fluid pressure controlled reaction pistons yieldably resisting movement of the control valve by the valve operator. Check valves opened in response to suction pressure, conduct fluid in by-pass relation to the control valve between a servo motor chamber and a return fluid line, the control valve connecting both servo motor chambers to the return line in the neutral position.

4 Claims, 1 Drawing Figure

U.S. Patent  Feb. 24, 1976  3,939,757
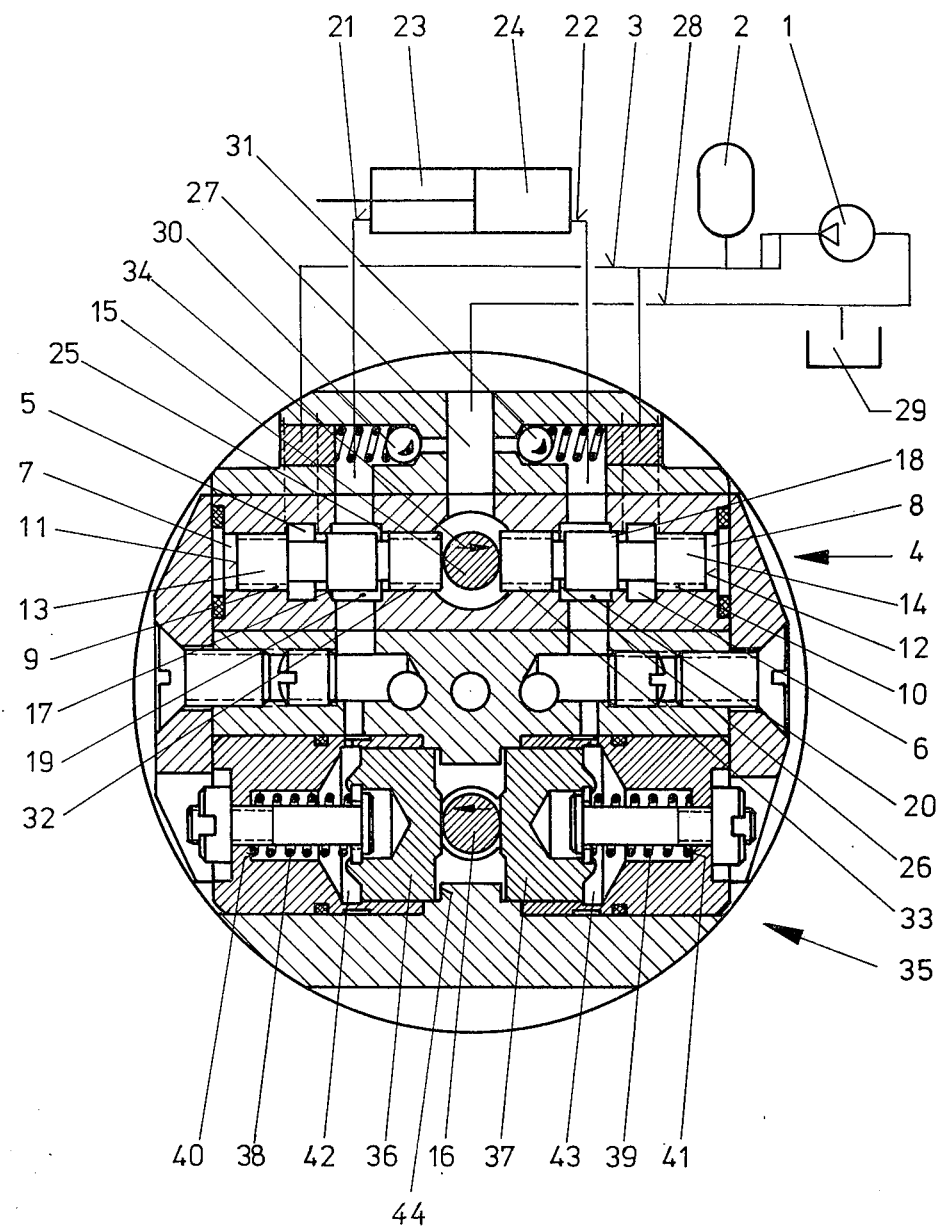

FLUID POWER STEERING SYSTEM WITH VALVE OPERATOR CONTROL MEANS

The invention relates to an auxiliary power steering system of the storage pressure type for motor vehicles, such as disclosed in my prior copending application, U.S. Ser. No. 266,053, filed June 26, 1972, now U.S. Pat. No. 3,855,904, with respect to which the present application is a continuation-in-part.

In auxiliary power steering systems, which operate with a fluid medium under a storage pressure, a special control valve is required, which differs considerably from control valves associated with other types of auxiliary power steering systems because the flow of oil through the control valve is blocked in the neutral position. In the aforementioned prior copending application, the disclosure of which is incorporated herein by reference, a control valve is described, having conical valve elements which release the pressure medium under control of the storage pressure. As compared thereto, a control valve utilizing cylindrical valve pistons, has the advantage of greater simplicity. Therefore, an important object of the invention is to provide a control valve having cylindrical valve pistons, whereby steering of a vehicle is possible when the engine is inoperative and no storage pressure is available as, for example, during towing of the vehicle.

The invention resides in a control valve having two cylindrical valve pistons, disposed symmetrically in relation to an operating pin, the pistons being acted upon by the storage pressure applied to front surfaces opposite the pin and to the provision of check valves between the return line and the line leading to one of the cylinder chambers for by-passing the control valve.

A further feature of the invention resides in the establishment of flow passages in the neutral position of the control valve between the cylinder grooves and the return chamber, and providing the reaction chamber, acted upon by the operating pressure of the assigned cylinder chamber, with a centering spring acting upon associated reaction pistons, to hold the valve operator in the neutral position.

An embodiment of the invention is described in more detail hereafter with reference to the drawing, which shows a cross section through the control valve and a schematic representation of the pressure medium flow lines.

Oil is conveyed from a pump 1, driven by the engine of the vehicle to a storage pressure accumulator 2 which is connected with the control valve 4 by way of a line 3, as a result of which the storage pressure is active in the annular grooves 5 and 6. Two front chambers 7 and 8 of the control valve 4 communicate with the annular grooves 5 and 6, through axial grooves 9 and 10. Thus, end faces 11 and 12 of two valve pistons 13 and 14 are exposed to the storage pressure to exert forces symmetrically on an operating pin 15. Although the high storage pressure holds the two valve pistons 13 and 14 in contact with pin 15, the latter are neutral in relation to the operating force at the operating pin 15, because the same hydraulic pressure forces act in opposite directions on the valve pistons 13 and 14, so that no special effort is needed for the shifting of the control valve 4. The operating pin 16 is shifted with the operating pin 15, in an opposite direction, both pins projecting from the end of a steering spindle connected with the steering wheel, as shown in my prior copending application, aforementioned. The annular groove 5 or 6 is separated from a cylinder groove 19 or 20 in neutral position by a control edge 17 or 18 of the valve body. The annular grooves 5 and 6 are connected to the storage pressure line 3, while the cylinder groove 19 is connected to a cylinder chamber 23 by a line 21. The cylinder groove 20 is connected to the cylinder chamber 24 by a line 22.

In the neutral position of the steering valve 4, the cylinder grooves 19 and 20 are connected by passages at the leading edges 25 or 26 in the valve body with a return chamber 27, connected to an oil reservoir tank 29 by return line 28. A short-circuiting check valve 30 is disposed between the line 21 and the return chamber 27 and a short-circuiting check valve 31 is disposed between the line 22 and the return chamber 27. These two check valves 30 and 31, which are closed in response to storage pressure operation, open each whenever a vacuum or suction pressure developes in one of the cylinder chambers 23 or 24 upon breakdown of the pressure storage accumulator 2, to establish communication between the return chamber 27 and the cylinder chamber 23 or 24, so that the vehicle, while being towed away, can still be manually steered. In the neutral position of the control valve 4, the connection between the cylinder groove 19 or 20 and the return chamber 27 is established by axial grooves 32 or 33 in the valve piston 13 or 14.

Whenever the steering wheel is turned in a clockwise direction for example, the operating pin 15 is moved toward the right, in the direction of the arrow 34, and the operating pin 16 toward the left. The valve pistons 13 and 14 are then shifted to the right and a part of a lower valve assembly 35 to the left. The lower valve assembly 35 produces a reaction force corresponding to that resulting from road contact, and at the same time carries a centering spring system for the steering system. Basically, the valve 35 consists of reaction pistons 36 and 37 abutting the operating pin 16 on both sides the pistons being held by means of centering springs 38 and 39, in contact with the operating pin 16, or in abutment with stops 44. The centering spring 38 or 39 also reacts against a stop 40 or 41 in a left-hand reaction chamber 42 or in a right-hand reaction chamber 43. The reaction chambers 42 and 43 are exposed to the operating pressure prevailing in the associated cylinder chamber 23 or 24. The valve pistons 13 and 14 are normally held in contact with the operating pin 15 by the storage pressure prevailing in the front chambers 7 and 8, and thereby fulfill their control function safely. In case of failure of the hydraulic system because of an empty pressure storage accumulator 2, for example, one of the cylinder chambers 23 and 24 will be blocked from the supply of the pressure medium and thus would block the steering. However, a followup flow of the pressure medium does occur through a corresponding short-circuiting check valve 30 or 31 to enable mechanical or non-power steering operation. When hydraulic system failure occurs, a mechanical connection exists, as is well known in the art, between the hand steering wheel of the vehicle and the steerable wheels through the piston of the servo motor. In such event, the piston of the servo motor is moved in the same direction as the valve operating pin 15 causing the fluid pressure medium on one side of the piston to be displaced from the cylinder chamber 23 or 24 through line 21 or 22 to the control valve 4 and into the return line 28 for return to the reservoir tank 29. At the same time, one of the short circuiting check valves 30 or 31 is open as a result of the under pressure developed in the cylinder chamber to which it is connected on the spring side. Fluid will accordingly flow from the return line 28 through the opened check valve into the chamber 23 or 24 of the servo motor being expanded as a result of piston movement to thereby prevent development of any significant vacuum pressure within such chamber.

I claim:

1. In combination with a power steering device adapted for a vehicle, having a servo motor (23–24) to which a fluid medium is supplied under an operating pressure for powered operation and a source (2) of said fluid medium under a storage pressure, a control valve (4) connected to said source, comprising a valve operator (15), two valve pistons (13 and 14) symmetrically engaging the valve operator and having opposed pressure faces continuously exposed to said storage pressure, conduit means (21 and 22) connected between the valve pistons and the servo motor for conducting flow of the fluid medium, said valve pistons being displaceable from a neutral position in which said flow of the fluid medium under said storage pressure is blocked and check valve means (30 or 31) responsive to depressurization of the source for conducting follow-up flow of the fluid medium to the servo motor through the conduit means in by-pass relation to the valve pistons, whereby mechanical operation of the steering device is enabled.

2. The combination of claim 1 including a low pressure return conduit (27) connected to the check valve means, said control valve including passage means (32 or 33) opened in a neutral position for establishing fluid communication between the return conduit and the servo motor.

3. The combination of claim 2 including reaction force applying means (36 and 37) engaging the valve operator for yieldably resisting movement thereof as a function of the operating pressure, and centering spring means (38 and 39) acting on the reaction force applying means for holding the valve operator in the neutral position.

4. The combination of claim 1 including reaction force applying means (36 and 37) engaging the valve operator for yieldably resisting movement thereof as a function of the operating pressure, and centering spring means (38 and 39) acting on the reaction force applying means for holding the valve operator in the neutral position.

* * * * *